(12) United States Patent
Carr et al.

(10) Patent No.: US 9,916,693 B1
(45) Date of Patent: *Mar. 13, 2018

(54) AUGMENTED REALITY GEOLOCATION OPTIMIZATION

(71) Applicant: INTERNATIONAL BUSINESS MACHINES CORPORATION, Armonk, NY (US)

(72) Inventors: James B. Carr, Worcester (GB); Mark Delaney, Raleigh, NC (US); Robert Grant, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,943

(22) Filed: Sep. 5, 2017

Related U.S. Application Data

(63) Continuation of application No. 15/585,209, filed on May 3, 2017.

(51) Int. Cl.
*G09G 5/00* (2006.01)
*G06T 19/00* (2011.01)
(Continued)

(52) U.S. Cl.
CPC .......... *G06T 19/006* (2013.01); *A63F 13/213* (2014.09); *A63F 13/25* (2014.09);
(Continued)

(58) Field of Classification Search
CPC .................................................. G06T 19/006
See application file for complete search history.

(56) References Cited

U.S. PATENT DOCUMENTS

| 8,522,263 B2 * | 8/2013 | Amada ................. H04M 3/567 709/219 |
| 9,269,112 B1 | 2/2016 | Manimaran |

(Continued)

OTHER PUBLICATIONS

Frank, "How to find Pokémon Go's Gyms and PokeStops", -Polygon, http://www.polygon.com/2016/7/7/12118576/pokemon-go-pokestop-gym-locations-map-g . . . , Jul. 7, 2016, pp. 1-4.

(Continued)

*Primary Examiner* — Charles Tseng
(74) *Attorney, Agent, or Firm* — Anthony R. Curro

(57) ABSTRACT

Providing of an electronic map displaying preferred real-world locations to utilize in connection with an augmented reality world. A request is received at a server computer to provide the electronic map to utilize in connection with the augmented reality world. A geolocation is received. Real-world locations in a vicinity are queried from a real-world location profile. A virtual location profile of virtual locations in the augmented reality world is accessed to generate an initial virtual location set. A participant preference profile containing virtual preferences and real-world preferences is accessed. Real-time participant data is accessed. The virtual locations in the initial virtual location set are prioritized to generate a prioritized virtual location set. The prioritized virtual location set is limited based upon the real-time participant data to generate a real-time prioritized location set. The electronic map is generated based upon the real-time prioritized location set, and transmitted.

1 Claim, 9 Drawing Sheets

(51) Int. Cl.
*A63F 13/25* (2014.01)
*A63F 13/213* (2014.01)
*G06F 17/30* (2006.01)
*G06T 11/20* (2006.01)

(52) U.S. Cl.
CPC .... *G06F 17/3087* (2013.01); *G06F 17/30241* (2013.01); *G06T 11/206* (2013.01)

(56) References Cited

U.S. PATENT DOCUMENTS

| | | | |
|---|---|---|---|
| 2008/0126284 A1* | 5/2008 | Forbes | G06K 9/00624 706/46 |
| 2010/0280920 A1 | 11/2010 | Scott et al. | |
| 2012/0306920 A1 | 12/2012 | Bathiche et al. | |
| 2015/0052479 A1* | 2/2015 | Ooi | G06F 3/04815 715/810 |
| 2015/0109337 A1* | 4/2015 | Hofmann | G06T 7/0002 345/633 |
| 2015/0186531 A1* | 7/2015 | Agarwal | G06F 3/04842 707/722 |
| 2016/0337827 A1 | 11/2016 | Bjontegard | |

OTHER PUBLICATIONS

Alexson, "Pokemon Go: 7 best places to catch Pokemon, battle gyms, meet players in Syracuse", Central NY Entertainment, updated Jul. 28, 2016, pp. 1-4.

Google, "Field Trip—Android Apps on Google Play", https://play.google.com/store/apps/details?id=com.nianticproject.scout&hl=en, Accessed on Mar. 11, 2017, pp. 1-3.

Bao et al., "Location-based and Preference-Aware Recommendation Using Sparse Geo-Social Networking Data", ACM SIGSPATIAL GIS '12, Nov. 6-9, 2012, pp. 1-10.

Mokbel et al., "Toward Context and Preference Aware Location Based Services", ACM, MobiDE'09, Jun. 29, 2009, pp. 1-8.

Musumba et al., "Context awareness in mobile computing: A review", http://www.ijmla.net, Published: May 23, 2013, pp. 1-10.

Mell et al., "The NIST Definition of Cloud Computing", National Institute of Standards and Technology, Special Publication 800-145, Sep. 2011, pp. 1-7.

Ruta et al., "A Semantic-Enhanced Augmented Reality Tool for Open Street Map POI Discovery", Transportation Research Procedia 3 (2014), Jul. 2-4, 2014, pp. 479-488.

IBM, List of IBM Patents or Patent Applications Treated as Related, Appendix P, dated Sep. 22, 2017, 2 pages.

Pending U.S. Appl. No. 15/585,209, filed May 3, 2017, entitled: "Augmented Reality Geolocation Optimization", 47 pages.

* cited by examiner

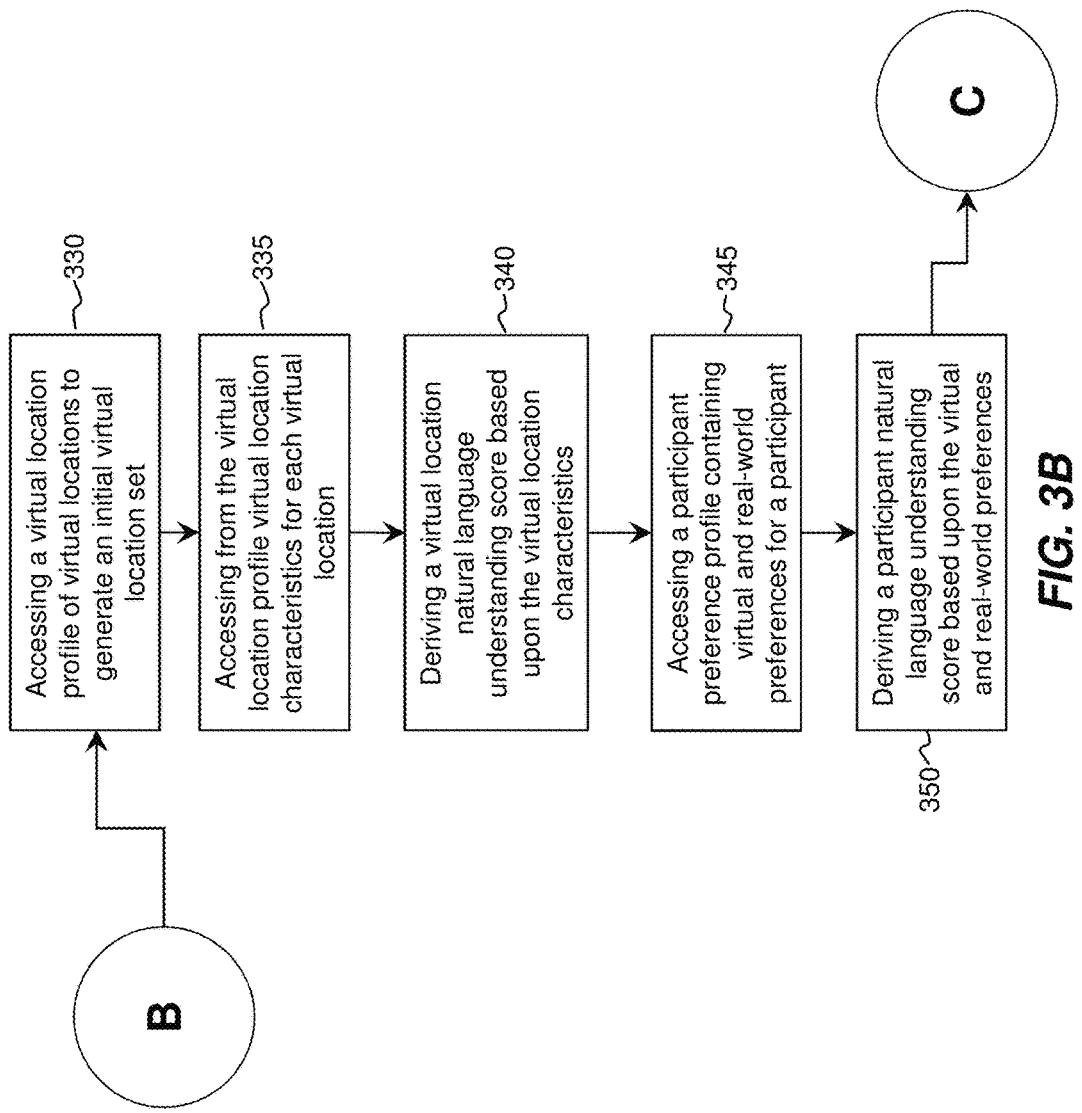

AUGMENTED REALITY GEOLOCATION OPTIMIZATION

BACKGROUND

The present invention relates generally to the field of augmented reality, and more particularly to augmented reality electronic gaming using real-world geolocations presented on a user-preferred basis.

BRIEF SUMMARY

Embodiments of the present invention disclose a method, system, and computer program product for providing to a user-computing device an electronic map displaying preferred real-world locations to utilize in connection with an augmented reality world. A request is received at a server computer to provide the electronic map displaying preferred real-world locations to utilize in connection with the augmented reality world. A geolocation of the user-computing device is received. Real-world locations in a vicinity are queried from a real-world location profile. A virtual location profile of virtual locations in the augmented reality world is accessed to generate an initial virtual location set, with each virtual location corresponding to one or more real-world locations. A participant preference profile containing virtual preferences and real-world preferences is accessed for a participant. Real-time participant data associated with the participant is accessed. The virtual locations in the initial virtual location set are prioritized based upon the virtual preferences and real-world preferences to generate a prioritized virtual location set. The prioritized virtual location set is limited based upon the real-time participant data to generate a real-time prioritized location set. The electronic map is generated based upon the real-time prioritized location set. The server computer finally transmits the generated electronic map to the user-computing device, for further use in connection with the augmented reality software.

BRIEF DESCRIPTION OF THE DRAWINGS

FIGS. 3A, 3B, 3C, and 3D are a flowchart depicting operational steps that a hardware component of a hardware appliance may execute, in accordance with an embodiment of the invention.

DETAILED DESCRIPTION

Figure 1:
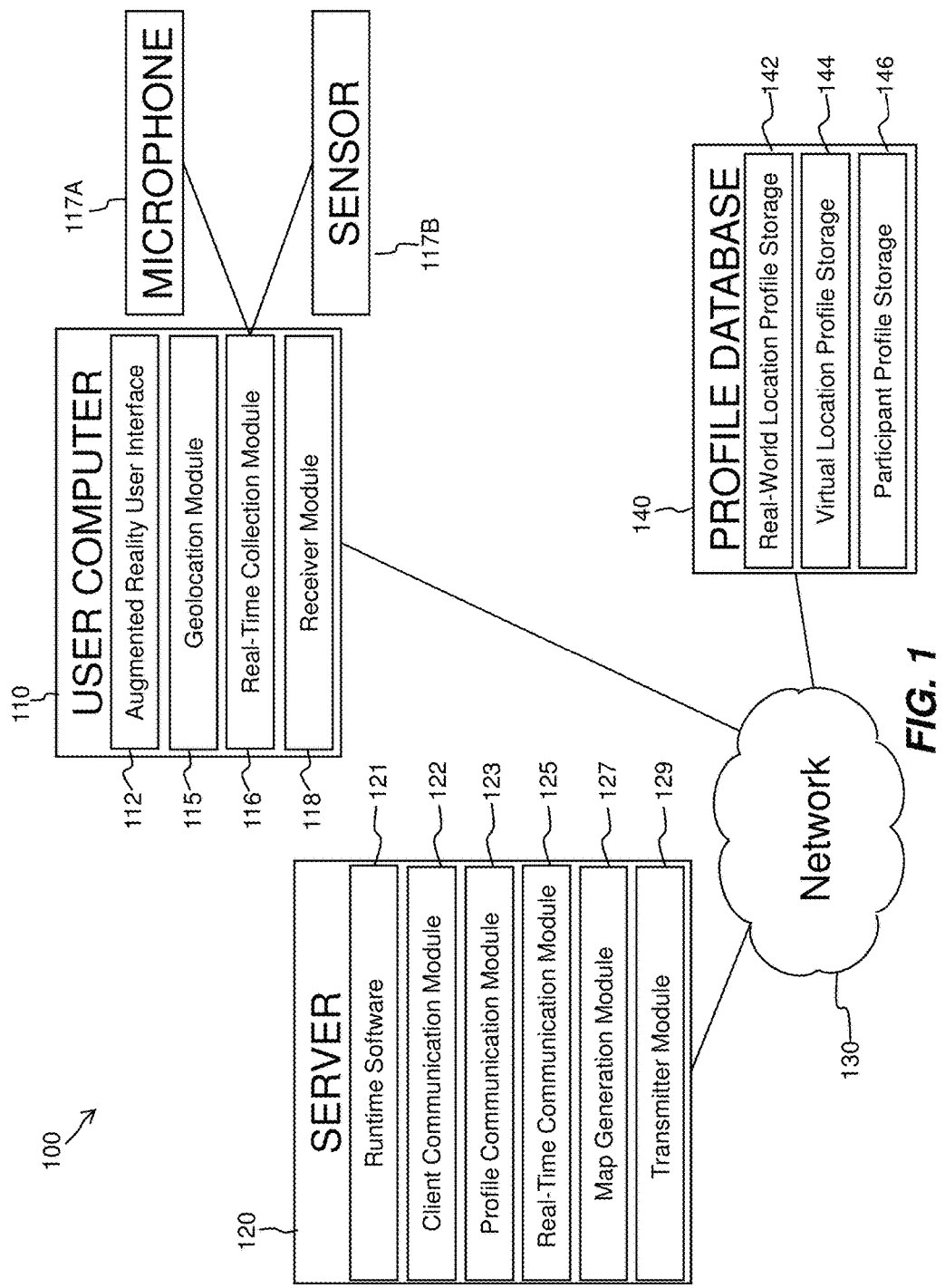
FIG. 1 is a functional block diagram illustrating an environment for augmented reality geolocation optimization, in accordance with an embodiment of the present invention.

Augmented reality games and other augmented reality software are increasingly popular, and new uses for the technology are constantly being found. Augmented reality software may be used for functions such as playing a video game, visualizing a pool shot, looking at celestial bodies, locating veins during surgery, visualizing furniture placed in a house before it is purchased, etc. Augmented reality software may utilize video or still real-world scenes obtained from a camera of a mobile phone or other mobile electronic device, with the software serving to enhance, supplement, or replace the real-world scenes to generate composite views, and thereby perform the function the software is intended for. Augmented reality software may be tied to certain real-world locations which have significance in the context of the augmented reality software or have certain characteristics which are desirable/preferred by users accessing the augmented reality software ("participants"). Participants may be encouraged to utilize the augmented reality software, particularly at these geolocations. If the augmented reality software is a video game, for example, participants may use such real-world geolocations to compete against other participants in the augmented reality game. In such circumstances, participants in the augmented reality game must select a geolocation to utilize the software to pair a virtual world with the real-world to generate an augmented reality world, and a solution would be advantageous to recommend real-world geolocations in the most effective fashion. Presented is a method, system, and computer program product to provide an electronic map to a user computer, the electronic map suggesting one or more real-world locations for use in connection with the augmented reality world, each real-world location corresponding to one or more virtual locations in the augmented reality world, based upon preferences of the participant, recommendations of previous participants, and other factors. The present invention has the advantage of presenting real-world locations not simply on the basis of proximity to the participant but those also personalized to the participant, making the augmented reality software more intimate and personalized.

"Augmented reality software," as discussed herein, is software to receive a view from the real-world, typically from a camera, and superimpose computer-generated imagery on the view in order to generate a composite view of the real-world and the virtual world. The resulting composite view provides computer-generated imagery replacing or further defining the image in the real-world in order to satisfy the function of the augmented reality software. The augmented reality software may be for superimposition of a classical coliseum or theater over a camera view of a modern day sports arena, for example, for the purposes of playing a video game. The computer-generated image is then presented to the participant of the augmented reality software. Such augmented reality software is frequently used in the context of video gaming, but has numerous other applications in the fields of general entertainment, astronomy, navigation, advertising, architecture, home design, gardening, etc. Augmented reality may also, or in the alternative, include audio aspects, replacing real-world audio with computer generated sound, or replacement of still imagery with electronic aspects.

"Virtual reality software," as discussed herein, is software to simulate a three-dimensional view of the augmented reality world, in alternate embodiments of the invention. The simulated three-dimensional view may be presented through a television, a monitor, headgear, a mobile electronic device, or other electronic device. In various embodiments of the present invention, virtual reality software works hand-in-hand or alternately with augmented reality software to offer multiple means for participants to access and participate in the augmented reality world (although it may be considered a "virtual reality world" for these participants).

A "real-world location profile," as discussed herein, is an electronically stored collection of information regarding real-world locations of significance in the context of the augmented reality software or having certain characteristics which are desirable/preferred by participants accessing the augmented reality software, and may include various data points regarding each real-world location. Each real-world location allows participants in the augmented reality software to participate utilizing the software at the physical, real-world location. Each physical, real-world location in the real-world location profile is located at a geolocation in the real-world. Note also that each real-world location corresponds to a virtual location within the augmented reality world (or possibly more than one virtual location). The various data points regarding real-world locations which may be included in the real-world location profile include characteristics, reviews, and descriptions for each of the real-world locations. Characteristics may include, by means of non-limiting example, whether a real-world location is indoors/outdoors, whether a location is kid-friendly, noise levels, lighting, etc. The various data points for the real-world location profile may be obtained from characteristics, reviews, and descriptions input by participants to the augmented reality software and/or by means of non-limiting example, from check-ins to social media pages (such as Facebook®, Google+®, Foursquare®, etc.), trends of where participants or other individuals are ordinarily at certain times of the day, time spent at a location, gaming statistics, various comments, opinions regarding real-world locations available via other websites, etc. Any or all data points may be utilized by embodiments of the presently disclosed invention in derivation of a real location natural language understanding score for each of the real-world locations, utilizing natural language understanding software to analyze the various data points, and/or a real location sentiment score, containing a numeric assessment of various participants' sentiments regarding the real-world location, such as on a 1-10 scale, or one, two, three, or four stars for each of the real-world locations, for further use as discussed below. The real-world profile may be stored, in a preferred embodiment, in objects or classes of a programing language, as those terms are understood to one of skill in the art, but in alternate embodiments are stored in any sort of program, data structure, database entry, matrix, array, spreadsheet, or any other computer accessible form, in accordance with embodiments of the invention.

A "virtual location profile," as discussed herein, is an electronically stored collection of information regarding virtual locations of significance within the augmented realty world, and may include various data points regarding each virtual location. Typically, at these virtual locations, a composite view may be utilized to replace or further define an image in the real-world. The various data points which may be included regarding each virtual location include virtual location characteristics, such as a type of virtual location, features, number of participants presently at the virtual location, max number of participants at the virtual location, significance at virtual location, user sentiment, comments, aura within game, etc. The virtual location characteristics may be input by the augmented reality developers, input by previous participants, gathered by usage of the augmented reality software (such as by collection of augmented reality statistics (points, wins/losses, etc.), collection from competitive play, collection from "fun" play, playing time, augmented reality world locations visited, in-game voice chat, in-game text chat, etc.). Any or all data points may be utilized by the presently disclosed invention in derivation of a virtual location natural language understanding score for each of the virtual locations (utilizing natural language understanding software to analyze the various data points) and/or a virtual location sentiment score (containing a numeric assessment of various participants' sentiments regarding the real-world location, such as on a 1-10 scale, or one, two, three, or four stars) for each of the virtual locations, for further use as discussed below. Each virtual location in the virtual location profile may correspond directly with a real-world location, or have other significance. If virtual locations correspond directly with real-world locations, the virtual locations may share characteristics with the real-world locations. If, for example, a real-world location is outdoors and open such as a park, the corresponding virtual location is also outdoors and open such as an open field surrounded by trees within the augmented reality world. If the real-world location is underground and dimly lit, such as a dark bar in a basement, the corresponding virtual location is also dimly lit, cavernous, and possibly underground such as a cavern or the like. The virtual location profile may be stored, in a preferred embodiment, in objects or classes of a programming language, as those terms are understood to one of skill in the art, but in alternate embodiments are stored in any sort of program, data structure, matrix, array, spreadsheet, or any other computer accessible form, in accordance with embodiments of the invention. The virtual location profile may be generated initially by augmented reality developers, and may also be updated manually or automatically as the augmented reality world evolves.

A "participant preference profile," as discussed with reference to this patent application, is an electronically stored collection of participant preferences for and/or participant history at real-world locations ("real-world preferences") and participant preferences for and/or history at virtual locations ("virtual preferences") in the augmented reality world. In a preferred embodiment, real-world preferences include preferences for certain real-world location characteristics, such as whether a location is outdoors or indoors, a nature or type of a location (whether a restaurant, bar, sporting arena, open field, shopping mall, parking lot, retail business, etc. is preferred), weather at the location, a number of other augmented reality participants at the location (greater than or equal to a certain amount, or less than or equal to a certain amount), whether the real-world location serves alcoholic beverages, a type of participant present, indoors/outdoors, whether the real-world location has high ratings or low ratings from other augmented reality participants, high/low ratings from virtual reality participants, high/low ratings from visitors to the real-world location who are not participants in augmented reality software at all, ratings that are relevant to game play e.g. it's a foodie game and the location is known to have good/bad food, and/or any other characteristics. Virtual preferences may include preferences for certain augmented reality world location characteristics, such as whether a location is outdoors or indoors in the augmented reality world, a number of other augmented reality participants at the virtual location (greater than or equal to a certain amount, or less than or equal to a certain amount), whether the location has importance in the augmented world (on a rating of 1.0 to 5.0), whether a "boss" monster is located at the virtual location, whether the virtual location is part of an in-game quest, and/or any other characteristics. The virtual preferences and real-world preferences may correspond with each other or not. A preference for sunny, outdoor locations in the real-world indicates a preference for sunny, outdoor virtual locations as well, whereas a preference in the augmented reality world for confronting undead over goblins has no meaningful corresponding real-world preference. In another embodiment, the participant preference profile simply contains preferences for certain real-world locations (tracked by geolocations, or the like) or certain virtual locations (tracked by augmented reality world coordinates or virtual location name). The participant preference profile is generated from information such as previous use of the augmented reality software, use of social media software (Facebook®, Twitter®, Google+®, etc.), interactions with other participants, chats, SMS messaging, e-mails, call logs, surveys, forums external to the game, data collected from microphones utilized by the participants previously, connections to external websites, or any other text or voice data, etc. A natural language classifier, such as might be performed by IBM Watson® may be utilized, in an embodiment of the invention, to interpret and seek relevant data from any text or voice data. The real-world preferences and the virtual preferences may be utilized by the presently disclosed invention in derivation of a participant natural language understanding score and/or a participant sentiment score, for further use as discussed below. The participant preference profile may be stored, in any embodiment, in objects or classes of a programming language, as those terms are understood to one of skill in the art, but in alternate embodiments are stored in any sort of program, data structure, matrix, array, spreadsheet, or any other computer accessible form, in accordance with embodiments of the invention.

"Real-time participant data," as discussed with reference to this patent application, is an electronically obtained and stored collection of data regarding a current status of an augmented reality world participant, in the real-world. The real-time participant data may be based on inputs from a microphone, determination of geolocation (such as transmitted by a mobile device), determination of then-current weather the participant is experiencing in the real-world (such as available from a website or from a local weather sensor), determination of current time for the participant, determination of who the participant is traveling with (such as from other mobile devices in the vicinity of the participant), various other sensors, or any other means of collection of data in real-time from a participant, which current status is further used as discussed below. The microphone may, for example, collect data from the participant for electronic analysis as the participant travels through the real-world and speaks to various individuals, and thereby determine the participant is traveling with a young child or other family member. Determination of geolocation may indicate the participant is traveling via automobile, public transportation, or walking. Determination of geolocation and/or electronic analysis of microphones for multiple participants may also indicate whether the participant is traveling with a group of similar participants in the augmented reality world for the augmented reality software. All real-time participant data may be utilized by the presently disclosed invention in derivation of a real-time natural language understanding score and/or a real-time sentiment score, for further use as discussed below. The real-time participant data may be stored, in a preferred embodiment, in objects or classes of a programming language, as those terms are understood to one of skill in the art, but in alternate embodiments are stored in any sort of program, data structure, matrix, array, spreadsheet, or any other computer accessible form, in accordance with embodiments of the invention. To maintain compliance with various data privacy laws, if any, the presently disclosed invention may require explicit opt-in by the participant for collection of real-time participant data.

FIG. 1 is a functional block diagram illustrating an environment for augmented reality geolocation optimization, in accordance with an embodiment of the present invention. In an exemplary embodiment, included in the environment for augmented reality geolocation 100 is a user computer 110 (or "user-computing device"), a server 120 (or a "server computer"), and a profile database 140. A microphone 117A and a weather sensor 117B are also shown as operatively connected to the user computer 110.

In various embodiments, network 130 can be any combination of connections and protocols that will support communications between user computer 110, server 120, and profile database 140, all interconnected via a network 130. In various embodiments, network 130 represents, for example, an internet, a local area network (LAN), a wide area network (WAN) such as the internet, and includes wired, wireless, or fiber optic connections. In general, network 130 can be any combination of connections and protocols that will support communications between user computer 110, server 120, and profile database 140, in accordance with an embodiment of the invention.

In various embodiments, each of user computer 110, server 120, and profile database 140 may be, for example, a mainframe or a mini computer, a laptop, a tablet, a netbook personal computer (PC), a mobile device (such as a cell phone or portable data assistant), a desktop computer, or any sort of computing platform possessing sufficient processing power to perform the required functionality in accordance with the embodiment, including execution of the augmented reality software as discussed further above and below. Each of user computer 110, server 120, and profile database 140 may include internal and external hardware components as depicted and described in further detail below with reference to FIG. 4, below. In other embodiments, each of user computer 110, server 120, and profile database 140 may be implemented in a cloud computing environment, as described in relation to FIGS. 5 and 6, below.

User computer 110, utilizing hardware as discussed above, includes an augmented reality user interface 112, a geolocation module 115, a real-time collection module 116, and a receiver module 118. Microphone 117A and/or weather sensor 117B are operatively connected to the user computer 110.

Augmented reality user interface 112 represents a user computer 110 installation of an interface for playing, utilizing, accessing, or otherwise using the software, as would be understood by a person of skill in the art. In practice, the augmented reality user interface 112 may be a screen on a mobile device such as a cell phone, a computer screen, augmented reality goggles, or any other type of digital screen. In various embodiments, the augmented reality user interface 112 is accessed or otherwise utilized by the participant in order to play the augmented reality game or otherwise utilize the augmented reality software. The augmented reality user interface 112 is in communication with the server 120, for the performing of functionality as discussed further above and below. In the preferred embodiment, a request is made at the augmented reality user interface 112 for an electronic map displaying one or more real-world locations to utilize in connection with the augmented reality world. Alternately, when the participant accesses the augmented reality user interface 112 or simply accesses the user computer 110 the electronic map is automatically presented. The electronic map provides preferred locations for a participant to physically travel to utilize the augmented reality software to play a video game against others, perform a function, view astronomical events, etc. The participant may desire, for example, to fight his monster against another participant's monster in one of the real-world locations, or have a discussion with fellow amateur astronomers regarding a celestial event at a common place, etc.

In an alternate embodiment, the electronic map is generated as previously, based upon request, automatically upon access, etc., but instead of displaying one or more real-world locations to utilize in connection with the augmented reality world for physical travel, the electronic map presents one or more real-world locations to utilize in connection with the augmented reality world in a purely virtual fashion, i.e. where the participant travels to the locations within the augmented reality software to play in a realistic setting based upon the real, physical world, but modified according to the desires of the augmented reality software (as with more traditional virtual reality software). This may occur via utilization of a gaming console, virtual reality headset, personal computer, etc., acting as the user computer 110. This allows the participant, playing alone or in a group of participants to travel virtually to a location, to play against other participants who may themselves be playing virtually or in-person.

The geolocation module 115 of the user computer performs the function of obtaining a geolocation where the user computer 110 is located in real-time, and transmitting it to the server 120 for further use, as discussed below. Any of numerous means may be utilized for determining of the geolocation of the user computer 110, including location with a social media account check-in, identification of other check-in locations via various websites, a global positioning system, cell-phone tower triangulation, wi-fi hotspot usage, cell-phone signal strength assessment, round trip time calculations, peer-to-peer communications with other mobile computing devices, and online establishment reviews. Any combination of these may also be used, or any other presently existing or after-arising techniques. The real-time providing of geolocation is crucial for the functioning of the presently disclosed invention. The real-time geolocation module 115 may be installed on other participants' user computers 110, and then utilized to determine whether the participant is traveling with a group of other participants. Information regarding whether the participant is in a group of other participants may be utilized in further ways, as discussed below.

The real-time collection module 116 operates in various ways to obtain real-time participant data associated with the participant. As further discussed above, the real-time participant data is data regarding the current status of the participant, and may indicate method of travel the participant is using, who the participant is traveling with, local weather, time sensitivities, (e.g., if there is certain traffic patterns at certain times of day, if the participant has an appointment scheduled at 2:00 p.m., if the participant has to pick up a child at daycare at a certain time, etc.). Real-time participant data is collected in conjunction with the geolocation module 115, in conjunction with other geolocation modules 115 on other participants' user computers 110 (not shown here), independently by the real-time collection module 116 via the microphone 117A or weather sensor 117B, or in some other manner.

In an embodiment, geolocation data is used by the real-time collection module 116 in the obtaining of real-time participant data. Geolocation data may be obtained by the real-time collection module 116 from the geolocation module 115 or obtained via the network 130 from other user computers' (not shown) geolocation modules 115. Geolocation data may indicate how the participant is traveling (such as whether he or she is walking, traveling by car, public transportation, flying, etc., based on the speed and location of the participant), as well as indicate who the participant is traveling with (other participants, children, spouse, family, etc.). After such real-time participant data is collected, it is used further as described below.

In a further embodiment, the real-time collection module 116 may gather information regarding the present weather in the area of the participant directly via weather sensor 117B, a separate website available via the network 130, or in some other manner. This weather data may then be used as real-time participant data. If the weather indicates a sunny, not very-hot day, it may be preferable for the participant to be outside. If rain, snow, or extremely hot or cold weather is indicated, the participant should be outside. A more detailed discussion regarding such real-time participant data is below.

In the alternate embodiment allowing virtual travel, as discussed above, real-time participant data is utilized to determine preferences for presentation of options exclusively within the augmented reality world. For example, if the participants enjoy sunny, bright locations, then sunny and bright locations are presented within the augmented reality world.

In a still further embodiment, the real-time collection module 116 operating independently gathers real-time participant data from a microphone 117A, or microphones 117A associated with other user computers 110 (not shown). Natural language understanding software is then used to interpret the discussions (or other sound) obtained. Such discussions or other sound may be utilized to determine who the participant might be traveling with (such as a minor child), where the participant is located, how the participant is traveling, what the participant is presently doing, etc. The uses of the collected real-time participant data are further discussed below. Such real-time participant data is used further as described below.

Any of the above embodiments may be used in the alternate, or in combination, or various steps may not even be performed at all. Participants may have to explicitly consent into utilization of the geolocation module 115 or microphone 117A, for purposes as described herein, if required by any law, policy, or regulation.

The receiver module 118 allows the receipt of the electronic map at user computer 110 after generation by the server 120. The generation of the electronic map is described in more detail below.

Profile database 140 represents one or more computer databases which possesses sufficient processing power allowing storage and access to various computer data and files upon request. Specifically available via the profile database 140 is real-world location profile storage 142, virtual location profile storage 144, and participant profile storage 146.

Real-world location profile storage 142 contains one or more real-world location profiles regarding real-world locations of significance within the augmented reality world. Real-world location profile storage 142, is discussed further below.

Virtual location profile storage 144 contains one or more virtual world location profiles regarding virtual locations of significance within the augmented reality world. Virtual location profile storage 144, is discussed further below.

Participant profile storage 146 contains virtual preferences and real-world preferences for participants. Participant profile storage 146 is discussed further below.

Server 120 represents a network computing platform which possesses sufficient computing power to host workload 96 of FIG. 6 below. Server 120 includes runtime software 121, a client communication module 122, a profile communication module 123, a real-time communication module 125, a map generation module 127, and a transmitter module 129.

Runtime software 121 stores and executes the majority of the runtime software, except as discussed otherwise. The augmented reality software engine, graphics, etc. are processed herein.

Client communication module 122 provides functionality by which a request is received to provide an electronic map displaying one or more preferred real-world locations to utilize in connection with the augmented reality world. Client communication module 122 further receives the geolocation of the user computer 110. In an alternate embodiment, the client communication module 122 itself determines the geolocation of the user computer, according to geolocation determination techniques more fully discussed above and below. After-arising techniques are specifically contemplated.

The profile communication module 123 queries from the profile database 140 a real-world location profile stored in real-world location profiles storage 142 containing one or more real-world locations in a vicinity of the geolocation which may be appropriate to utilize in connection with the augmented reality world. Real-world locations may be in the vicinity if they are, for example, one-half mile from the geolocation, one mile from the geolocation, two miles from the geolocation, five miles from the geolocation, and ten miles from the geolocation. Different distances may be utilized on a participant preferred basis, or set by developers. These relatively short distances are utilized to maintain accessibility to the participants of the augmented reality world.

The real-world locations in the vicinity are designated by the augmented reality developers to be of special interest with respect to the augmented reality world. If, for example, the augmented reality world is dedicated to gaming, the real-world locations may be sporting arenas which are designated by the developers to have significance within the augmented reality world, such as for transformation to quasi-historical Roman-style coliseums. Alternately, if the augmented reality world is devoted to astronomy, the real-world locations may be fields with a clear line of sight to the sky. In a further embodiment, characteristics, reviews, and descriptions (or other data points) for the one or more real-world locations are queried as well. The characteristics, reviews, and descriptions (or other data points) are utilized to derive a real location natural language understanding score and/or a real location sentiment score, for further use as discussed below. In a still further embodiment, locations are not included in the real-world location profile if the real-world locations have a negative general rating based upon previous reviews from other participants.

In the alternate embodiment allowing virtual travel to real-world locations exclusively within the augmented reality world, real-world locations in the vicinity may be virtually visited by the participant, in a form usable by the augmented reality software.

The profile communication module 123 accesses from the virtual location profile storage 144 of profile database 140 a virtual location profile of virtual locations in the augmented reality world which correspond to the one or more real-world locations previously returned by query to generate an initial virtual location set. The initial virtual location set may be a data table, variable, or object of virtual locations, or a more complex object or data structure. Depending upon the nature of the augmented reality world, each real-world location is matched with appropriate virtual locations. Continuing with regard to the examples discussed above, if the augmented reality world is dedicated to gladiator-style combat, the virtual locations may be Roman-style coliseums overlying modern sporting arenas. If the augmented reality world is devoted to astronomy, the virtual locations may simply be real-world open fields with celestial bodies labeled and constellations drawn over the sky, as appropriate. In a further embodiment, virtual location characteristics (or other data points) for the one or more virtual locations are queried as well. The virtual location characteristics (or other data points) are utilized to derive a virtual location natural language understanding score and/or a virtual location sentiment score, for further use as discussed below.

The profile communication module 123 then accesses from participant profile storage 146 of the profile database 140 a participant preference profile containing virtual preferences and real-world preferences for a participant. The virtual preferences may indicate, as discussed above, which locations in the augmented reality world are preferred by the participant, such as because of certain characteristics desired for augmented reality world locations, certain preferences for gameplay, etc. In a further embodiment, a participant natural language understanding score and/or a participant sentiment score is derived based upon the virtual preferences and real-world preferences for the participant for later use as discussed below.

The real-time communication module 125 communicates with the real-time collection module 116 to access real-time participant data associated with the participant. The definition and sources of real-time participant data are provided above. In a further embodiment, a real-time natural language understanding score and/or a real-time sentiment score are derived based upon the real-time participant data.

The map generation module 127 then takes the next step of prioritizing the one or more virtual locations in the initial virtual location set based upon the virtual preferences and real-world preferences, to generate a prioritized virtual location set. In effect, the map generation module 127 takes account of the virtual preferences and the real-world preferences for the participant and ranks the virtual locations based upon the preferences of the participant. Since multiple ratings may be conflicting, a weighting or ranking system may be utilized to best serve the needs of the participant. This serves to create the best experience for the participant in the augmented reality world, whether the augmented reality world is devoted to online gaming, astronomy, architecture, or any other pursuit.

The map generation module 127 may then limit the prioritized virtual location set based upon the real-time participant data to generate a real-time prioritized location set. If, for example, the real-time participant data indicates that the participant is with a child, bars (an establishment which serve alcohol) are immediately removed from the real-time prioritized location set, to maintain child-friendliness. If the real-time participant data indicates that the participant is traveling with multiple participants, locations that allow only a single participant are removed from consideration. Only real-world locations appropriate for a group of participants remain for consideration.

In a further embodiment of the invention, the map generation module 127 may prioritize again the real-time prioritized location set based upon any combination of the real location natural language understanding score, the virtual location natural language understanding score, the participant natural language understanding score, and the real-time natural language understanding score. Alternately, or in addition, any or all of the real location sentiment score, virtual location sentiment score, the participant sentiment score, and the real-time sentiment score may be utilized to prioritize the real-time prioritized location set. Usage of some or all of these variables serves to best serve the needs of the participant, re-organizing or eliminating locations which are not desirable based upon a multi-factor analysis while suggesting those more in-line with present needs.

The map generation module 127 generates the electronic map based upon the real-time prioritized location set. The electronic map presents both the virtual locations which have been generated as the real-time prioritized location set, as well as the corresponding real-world locations.

In a still further embodiment, the map generation module 127 may request manual input from the participant via the augmented reality user interface 112 after presentation of the electronic map, allowing for last minute fine tuning by the participant. For instance, if it is too hot outside, the participant can manually remove outdoors locations without air conditioners. If the participant knows that a car accident has just occurred on route to a real-world location, a new real-world location can be selected to avoid traffic. The manual input is entered via a web button or selection screen, such as presented in connection with FIG. 2.

The transmitter module 129 transmits the electronic map to the user computer, for presentation to the participant. A further discussion of this, and illustrations are provided below in connection with FIGS. 2 and 3 below.

Figure 2:
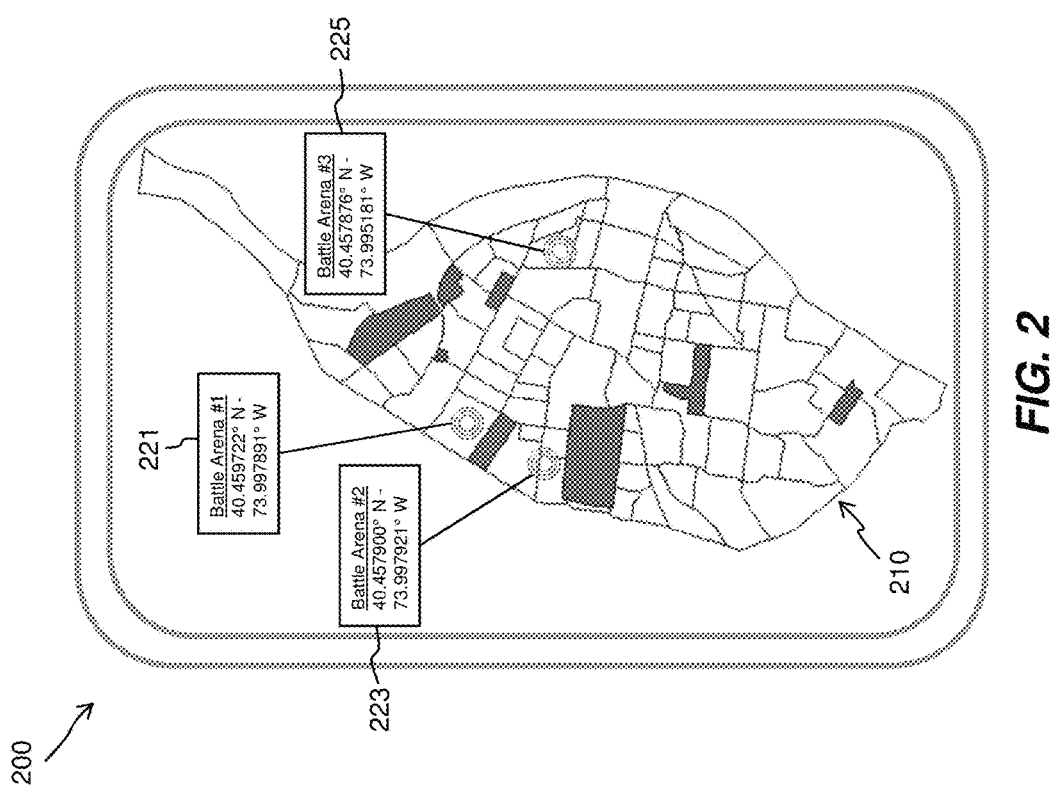
FIG. 2 is a simulated display of a cell phone, displaying an electronic map to utilize in connection with the augmented reality world, in an embodiment of the invention.

FIG. 2 is a simulated display of a cell phone 200 displaying an electronic map 210 showing soft screen buttons 221, 223, 225 allowing selection of one or more real-world locations to utilize in connection with the augmented reality world, in an embodiment of the invention. The electronic map 210 is generated via the presently disclosed invention, as discussed further above and below. Soft screen button 221 shows Battle Arena #1. It is located at coordinates 40.459722° N, 73.997891° W, as displayed in soft screen button 221. The participant receiving the electronic map 210 may travel to this location to engage in battles against other participants. The participant merely has to use a touchscreen of the cell phone 200 to touch the soft screen button 221 and a web mapping application (not shown here) will appear on the cell phone 200 providing turn-by-turn driving directions, walking directions, or public transportation directions for the participant to travel to the destination. Similarly, selection by the participant of soft screen button 223 (showing Battle Arena #2, at 40.457900° N, 73.997921° W) or soft screen button 225 (Battle Arena #3 at 40.457876° N, 73.995181° W) provides turn-by-turn directions to the respective destinations.

Figure 3A:
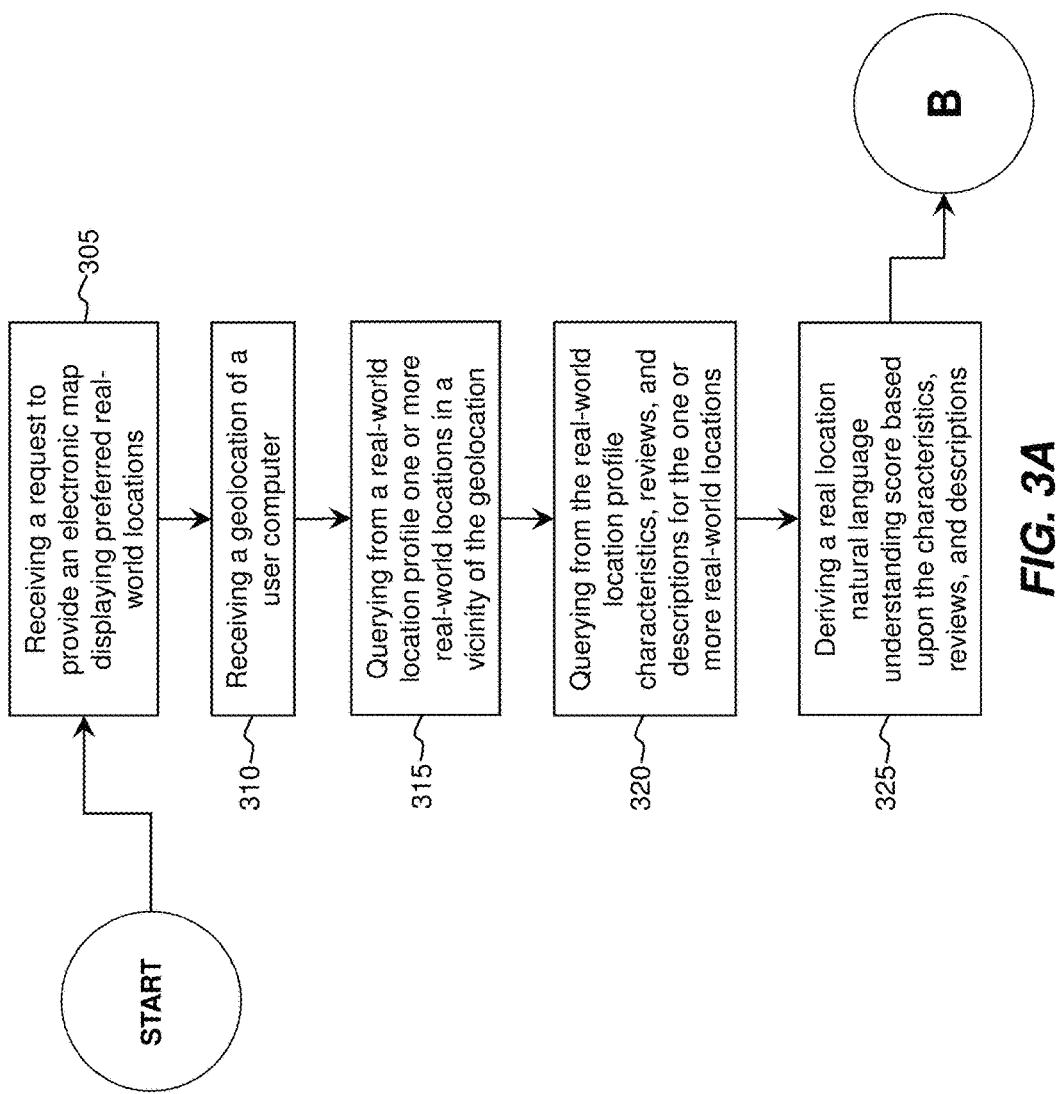

FIGS. 3A, 3B, 3C, and 3D are a flowchart depicting operational steps that a hardware component, multiple hardware components, and/or a hardware appliance may execute, in accordance with an embodiment of the invention. As shown in FIG. 3A, at step 305, a request is received by the client communication module 122 of server 120 from the augmented reality user interface 112 of user computer 110 to provide an electronic map displaying preferred real-world locations. The real-world locations are used in connection with the augmented reality world, as described above. At step 310, a geolocation of the user computer 110 is received by the client communication module 122 from the geolocation module 115 of user computer 110. Alternately, the geolocation may be determined independently by the server 120. At step 315, the profile communication module 123 communicates with the real-world location profile storage 142 of profile database 140 to query a real-world location profile of one or more real-world locations in a vicinity of the geolocation. In a further embodiment of the invention, the one or more real-world locations are in the vicinity of the geolocation if they are within one-half mile from the geolocation, one mile from the geolocation, two miles from the geolocation, five miles from the geolocation, or ten miles from the geolocation. At step 320, optionally, the profile communication module 123 queries from the real-world location profile storage 142 characteristics, reviews, and descriptions for the one or more real-world locations. At step 325, optionally, a real location natural language understanding score is derived based upon the characteristics, reviews, and descriptions.

Continuing in FIG. 3B, at step 330, the profile communication module 123 accesses virtual location profile storage 144 of profile database 140 to obtain a virtual location profile of virtual locations to generate an initial virtual location set. The virtual locations may correspond directly with the real-world locations. At step 335, optionally, the profile communication module accesses from the virtual location profile storage 144 virtual location characteristics for each of the virtual location. At step 340, optionally, a virtual location natural language understanding score is derived for each of the virtual locations based upon the virtual location characteristics. At step 345, the profile communication module 123 accesses the participant profile storage 146 to access a participant preference profile containing virtual and real-world preferences for a participant. At step 350, optionally, a participant natural language understanding score is derived based upon the virtual preferences and real-world preferences for the participant.

Figure 3C:
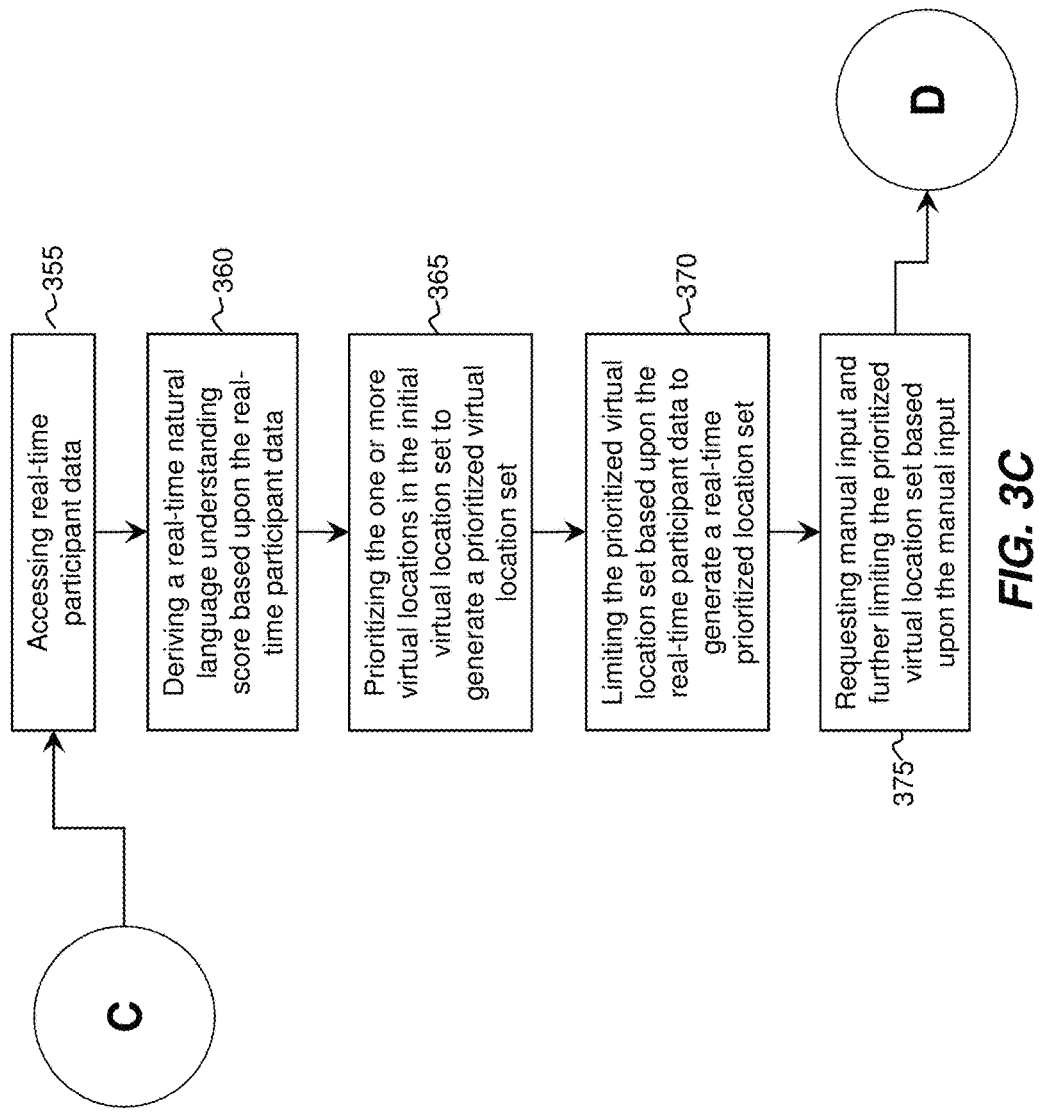

Still continuing in FIG. 3C, at step 355, real-time participant data associated with the participant is accessed by the real-time communication module 125 of server 120 from the real-time collection module 116 of the user computer 110. As discussed previously, real-time participant data is collected in different ways, including by access to a microphone 117A or sensor 117B associated with user computer 110. At step 360, optionally, a real-time natural language understanding score is derived based upon the real-time participant data. At step 365, the map generation module 127 prioritizes the one or more virtual locations in the initial virtual location set to generate a prioritized virtual location set. In an embodiment, the one or more virtual locations in the initial virtual location set are prioritized based upon the virtual preferences and real-world preferences previously accessed. At step 370, map generation module 127 limits the prioritized virtual location set based upon the real-time participant data to generate a real-time prioritized location set. At step 375, optionally, the client communication module 122 requests manual input from the participant and, after receiving it, the prioritized virtual location set is further limited based upon the requested manual input.

Figure 3D:
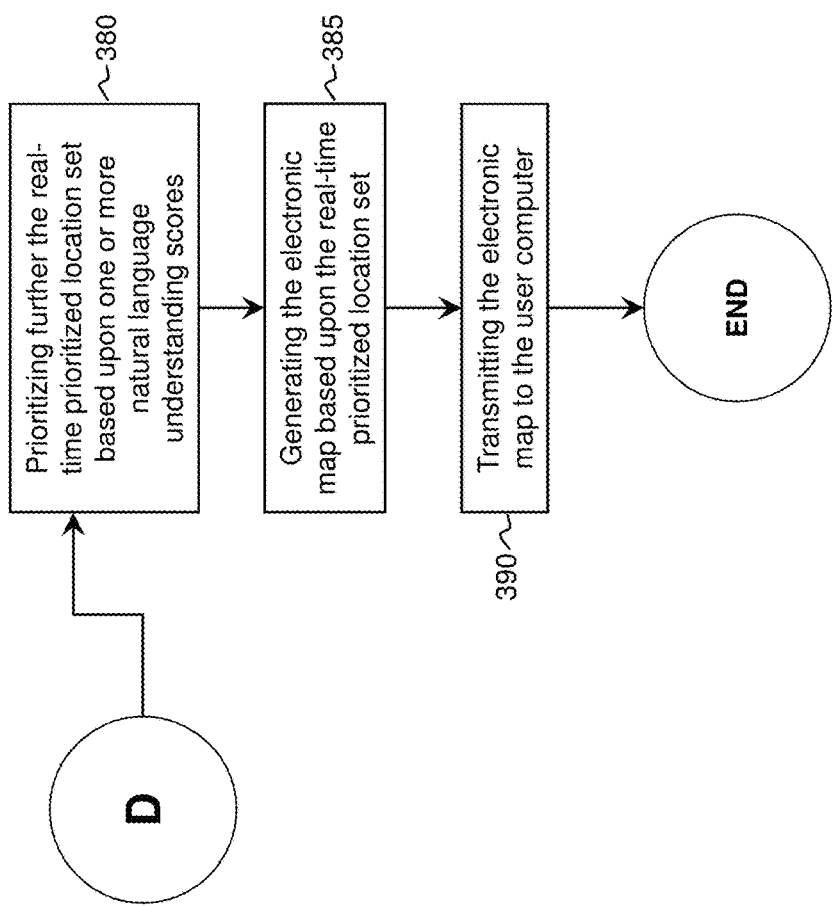

Finally, at FIG. 3D, at step 380, optionally, the map generation module 127 further prioritizes the real-time prioritized location set based upon any one or more previously derived natural language understanding score. Any combination (or, preferably, all) of the real location natural language understanding score, the virtual location natural language understanding score, the participant natural language understanding score, and/or the real-time natural language understanding score may be utilized. At step 385, the map generation module 127 generates the electronic map based upon the real-time prioritized location set. At step 390, the transmitter module 129 transmits the generated electronic map to the receiver module 118 of the user computer 110 for display to the participant. Such a display is simulated in connection with FIG. 2 (above).

Figure 4:
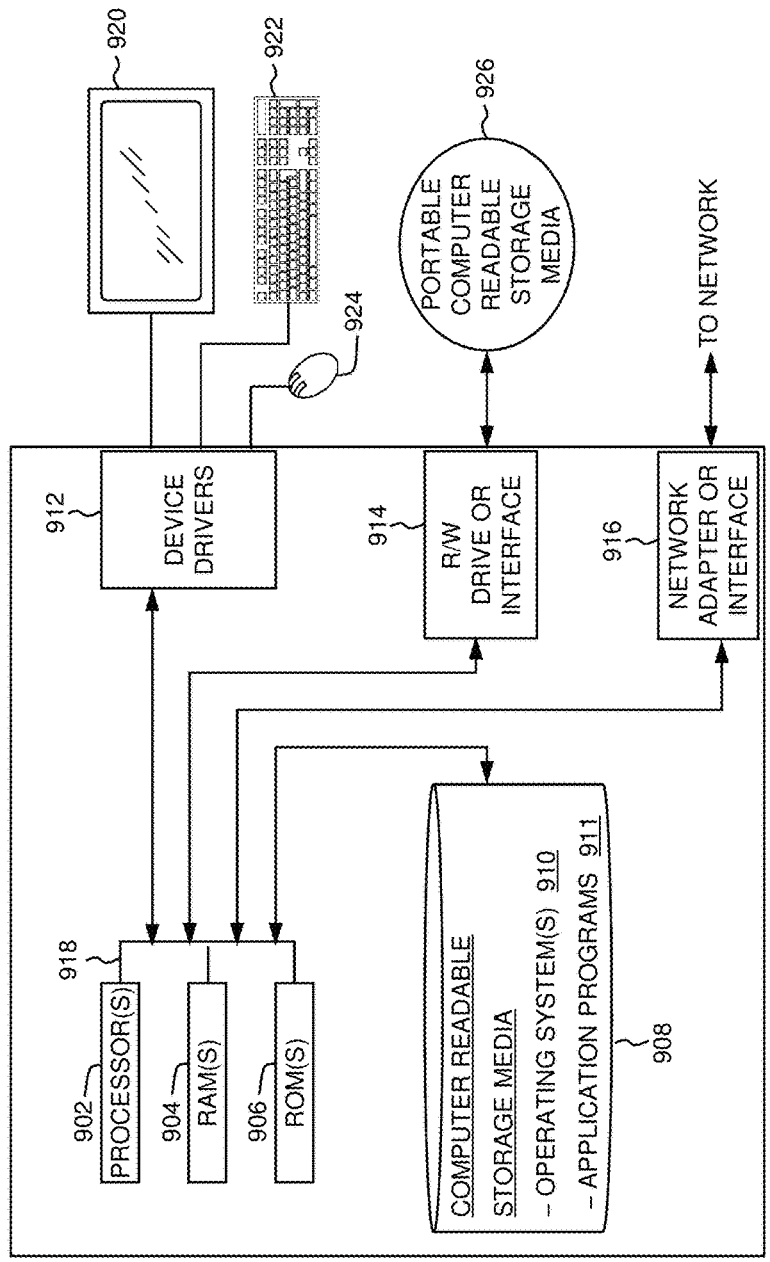
FIG. 4 depicts a block diagram of components of user computer and/or server of FIG. 1, in accordance with an embodiment of the present invention.

FIG. 4 depicts a block diagram of components of user computer 110 and/or server 120 of the environment for augmented reality geolocation 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

User computer 110 and/or server 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment for augmented reality geolocation 100, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computer 110 and/or server 120 may also include a R/W drive or interface 914 to read from and write to one or more portable computer readable storage media 926. Application programs 911 on computing device 106 may be stored on one or more of the portable computer readable storage media 926, read via the respective R/W drive or interface 914 and loaded into the respective computer readable storage media 908.

User computer 110 and/or server 120 may also include a network adapter or interface 916, such as a TCP/IP adapter card or wireless communication adapter (such as a 4G wireless communication adapter using OFDMA technology). Application programs 911 on User computer 110 and/or server 120 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computer 110 and/or server 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
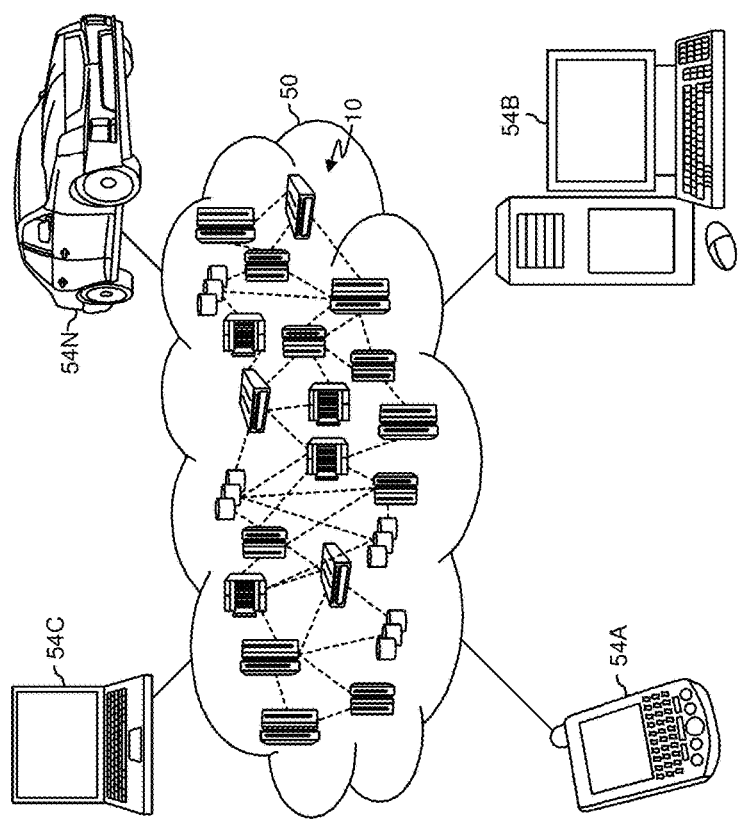
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
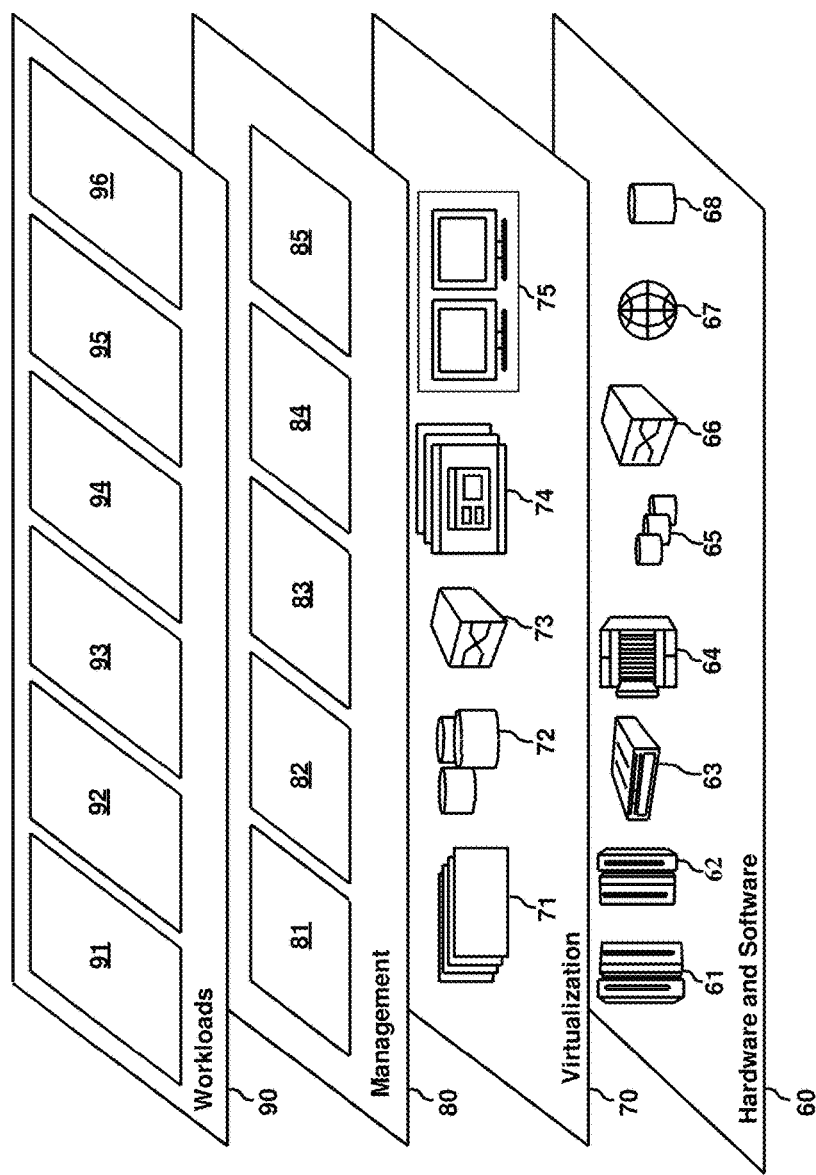
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment for augmented reality geolocation optimization 96.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A method of providing to a user-computing device an electronic map displaying one or more preferred real-world locations to utilize in connection with an augmented reality world, the method comprising:

Receiving a request at a server computer to provide an electronic map displaying one or more preferred real-world locations to utilize in connection with an augmented reality world;

Receiving a geolocation of a user-computing device;

Querying from a real-world location profile one or more real-world locations in a vicinity of the geolocation;

Removing from the real-world location profile one or more real-world locations each having a negative general rating;

Querying from the real-world location profile for each of the one or more real-world locations, characteristics, reviews, and descriptions for the one or more real-world locations and deriving a real location natural language understanding score for each of the one or more real-world locations based upon the characteristics, reviews, and descriptions;

Accessing a virtual location profile of virtual locations in the augmented reality world corresponding to the one or more real-world locations to generate an initial virtual location set;

Accessing from the virtual location profile, virtual location characteristics for each of the virtual locations and deriving a virtual location natural language understanding score for each of the virtual locations based upon the virtual location characteristics;

Accessing a participant preference profile containing virtual preferences and real-world preferences for a participant;

Deriving a participant natural language understanding score based upon the virtual preferences and real-world preferences for the participant;

Accessing real-time participant data associated with the participant, the real-time participant data collected from a microphone associated with the participant or a sensor associated with the user-computing device, the real-time participant data indicating the participant is in a group of participants;

Deriving a real-time natural language understanding score based upon the real-time participant data;

Prioritizing the one or more virtual locations in the initial virtual location set based upon the virtual preferences and real-world preferences to generate a prioritized virtual location set;

Limiting the prioritized virtual location set based upon the real-time participant data to generate a real-time prioritized location set to only include locations appropriate for a group of participants;

Prioritizing further the real-time prioritized location set based upon the real location natural language understanding score, the virtual location natural language understanding score, the participant natural language understanding score, and the real-time natural language understanding score;

Generating the electronic map based upon the real-time prioritized location set; and Transmitting by the server computer the electronic map to the user-computing device.

* * * * *